United States Patent [19]

Kasai et al.

[11] Patent Number: 6,007,592
[45] Date of Patent: Dec. 28, 1999

[54] POLISHING COMPOSITION FOR ALUMINUM DISK AND POLISHING PROCESS THEREWITH

[75] Inventors: Toshio Kasai, Urawa; Isao Ota, Funabashi; Takao Kaga, Funabashi; Tohru Nishimura, Funabashi, all of Japan

[73] Assignee: Nissan Chemical Industries, Ltd., Tokyo, Japan

[21] Appl. No.: 08/962,720

[22] Filed: Nov. 3, 1997

[30] Foreign Application Priority Data

Nov. 14, 1996 [JP] Japan .................................. 8-302715

[51] Int. Cl.$^6$ .............................. C09G 1/02; B24B 1/00
[52] U.S. Cl. ................................... 51/309; 106/3
[58] Field of Search ................... 106/3; 51/309; 252/79.1, 79.2

[56] References Cited

U.S. PATENT DOCUMENTS 4,705,566  11/1987  Senda et al. ................................ 106/3
4,769,046  9/1988  Senda et al. ................................ 106/3

FOREIGN PATENT DOCUMENTS

| 0 210 001 A1 | 1/1987 | European Pat. Off. . |
| 34 41 596 A1 | 5/1986 | Germany . |
| 1-121163 | 5/1989 | Japan . |
| A-1-205973 | 8/1989 | Japan . |
| B-2-23589 | 5/1990 | Japan . |
| A-2-158682 | 6/1990 | Japan . |
| A-2-158683 | 6/1990 | Japan . |
| A-3-277683 | 12/1991 | Japan . |
| B-4-38788 | 6/1992 | Japan . |
| A-5-271647 | 10/1993 | Japan . |
| WO 95 18193 | 7/1995 | WIPO . |

*Primary Examiner*—Michael Marcheschi
*Attorney, Agent, or Firm*—Oliff & Berridge, PLC

[57] ABSTRACT

A polishing composition for an aluminum disk includes water, an alumina abrasive agent and a polishing accelerator. The polishing accelerator is preferably basic aluminum nitrate. A process for polishing an aluminum disk using the polishing composition is also provided.

10 Claims, No Drawings

POLISHING COMPOSITION FOR ALUMINUM DISK AND POLISHING PROCESS THEREWITH

FIELD OF THE INVENTION

The present invention relates to a polishing composition which is used for the precision polishing, for an aluminum disk and the polishing process therewith. More particularly, the polishing composition according to the present invention may provide efficiently a polished surface having a smoothness of high accuracy in the polishing of an aluminum disk, so that it is useful as a final polishing composition. The polishing of an aluminum disk in the present invention means the polishing of the surface of a base material itself of a magnetic memory disk comprising aluminum or its alloys, the surface of a plated layer of Ni—P or Ni—B provided on the base material, particularly the surface of a hard layer of non-electrolysis nickel—phosphorus (Ni—P) plating having a composition of 90 to 92% Ni and 8 to 10% P, and the surface of an alumina layer.

In addition, according to the polishing processes by using a polishing composition according to the present invention, an aluminum disk having a polished surface with a smoothness and high accuracy may be obtained, thereby being useful.

DESCRIPTION OF THE RELATED ART

As a polishing composition used in the polishing of an aluminum disk, there has been used one in which water, an abrasive agent of alumina, and a polishing accelerator, occasionally further being mixed with a surface treatment agent, are slurried. As examples of the polishing accelerators, aluminum nitrate, nickel nitrate, nickel sulfate and the like are disclosed in Japanese Patent Publication No. Hei 2-23589 and nitrites of sodium, potassium, calcium, magnesium barium, zinc, aluminum etc. are disclosed in Japanese Laid-open Patent Application No. Hei 2-158682. A mixture of boehmite and water soluble metal salt is disclosed in Japanese Laid-open Patent Application No. Hei 1-205973, and a mixture of boehmite and ammonium salt of inorganic or organic acid is disclosed in Japanese Laid-open Patent Application No. Hei 2-158683. Further, as examples of polishing accelerators and surface treatment agents, there are disclosed polishing accelerators such as gluconic and lactic acid and surface treatment agents such as colloidal alumina in Japanese Patent Publication No. Hei 4-38788.

As to the mean particle size and alpha-phase content of an abrasive agent of alumina, an abrasive agent containing as a polishing component a square alumina having an alpha-phase content of 10 to 80% and a mean primary particle size of less than 2 $\mu$m, preferably 0.4 to 1.0 $\mu$m is disclosed in Japanese Laid-open Patent Application No. Hei 5-271647. An abrasive agent containing as a polishing component a square alumina having an alpha-phase of more than 95% and a mean primary particle size of less than 0.35 $\mu$m is disclosed in Japanese Laid-open Patent Application No. 3-277683.

Recently, it is seen the tendency that the performance of a magnetic memory disk is still more of high density and high speed. Therefore, an aluminum disk is required not only to eliminate surface defects such as an orange peel, scratch, pit, asperity, and the like as well as minimize the maximum surface roughness but also to provide a smaller polished surface in a mean surface roughness.

SUMMARY OF THE INVENTION

The present invention may satisfy the above-mentioned requirement, and an object of the invention is to provide a polishing composition and the polishing process thereof in which the removal rate is raised with maintaining a polished surface of high quality whereby the productivity in the polishing step may be improved at a lower cost.

The present inventors have found that a basic salt formed from a tri-or tetravalent metal and an inorganic or organic acid is an excellent polishing accelerator in a polishing composition containing water, an abrasive agent of alumina and a polishing accelerator. In comparison with a previous polishing composition for an aluminum disk, it has been found that a polished surface having a high ratio of removal rate to surface roughness, that is, a high removal rate and a high quality is obtained when an aluminum disk is polished with a polishing composition using a polishing accelerator according to the present invention and an abrasive agent of alumina which has a mean particle size of 0.1 to 0.4 $\mu$m and an alumina crystalline structure having an alpha-phase content of 80 to 95%, whereby the present invention has been accomplished.

The polishing accelerator according to the present invention is formed from a tri-or tetravalent metal and an inorganic or organic acid, and there is exemplified as a trivalent metal, for example, aluminum, indium, iron and the like, and as a tetravalent metal, for example, zirconium, cerium, tin, titanium and the like. There is exemplified as an inorganic acid, for example, nitric acid, sulfuric acid, and the like, and as an organic acid, for example, acetic acid, formic acid, sulfamic acid, tartaric acid, oxalic acid, gluconic acid, and the like. The polishing property of the polishing accelerator formed by a aluminum among tri-or tetravalent metals and nitric acid among inorganic and organic acids is best, and preferably basic aluminum nitrate is exemplified. On the other hand, a basic salt of chloride such as basic aluminum chloride is not preferred because it causes a problem such as stress corrosion of stainless steel so that the material to be used in the polishing machine is limited.

A preferable content of the polishing accelerator in the polishing composition according to the present invention is 0.1 to 10 wt %, more preferably 0.3 to 6 wt % for the basic salt formed by a trivalent metal and an inorganic or organic acid, referred to the reduced concentration of metal oxide $M_2O_3$ (wherein M represents a trivalent metal atom) and for the basic salt formed by a tetravalent metal and an inorganic or organic acid, referred to the reduced concentration of metal oxide $MO_2$ (wherein M represents a tetravalent metal atom).

As the abrasive agent of alumina of the present invention, abrasive agents on the market may be used. Alumina having a mean particle size of 0.5 to 50 $\mu$m and containing an alpha-phase is preferred which is obtained by calcining at 1,100 to 1,300° C. aluminum hydroxide, which is cheap and manufactured in a mass production by means of the Bayer process, and then dry-pulverizing by means of a vibration mill, a ball mill, an attritor etc. Further, alumina having a mean particle size of 0.1 to 0.4 $\mu$m and an alpha-phase content of 80 to 95% is more preferred which is obtained by wet-pulverizing the dry-pulverized alumina by means of a ball mill, an attritor, a sand grinder, etc.

In this case, the mean particle size of alumina means the median particle size (50% volume particle size). For the measurement of mean particle size, a centrifugal measurement device of particle size distribution on the market, for example, SA-CP by Shimadzu Corp. is used. The alpha-phase content of alumina may be obtained by the X-ray diffraction measurement of alumina to get the integral strength of the (113) plane diffraction line and the standardization of the resulting integral strength by means of integral strength of alumina whose alpha-phase content is previously standardized.

The preferred content of abrasive agent of alumina in the polishing composition is 1 to 20 wt %.

The polishing composition according to the present invention may be added with oxides such as zirconia, zirconium silicate, silica, mullite, cerium oxide, iron oxide, chromium oxide, titanium oxide and the like together with alumina. Further, a hydroxide such as aluminum hydroxide, a hydrated oxide such as boehmite and a non-oxide such as diamond, boron nitride, silicon nitride, silicon carbide, boron carbide, etc., may be added.

Moreover, the polishing composition according to the present invention may be added with the following substances, which are in general added to the composition, for example, a water soluble alcohol such as ethanol, propanol, ethylene glycol, and propylene glycol, an acid such as hydrochloric acid, sulfuric acid, nitric acid, acetic acid, and phosphoric acid, a surface active agent such as sodium alkylbenzene sulfonate, and formalin condensate, an organic substance of poly-anionic series such as polyacrylic acid salt, a cellulose such as cellulose, hydroxyethyl cellulose, and carboxymethyl cellulose.

DETAILED DESCRIPTION OF THE PREFERRED EMBODIMENTS

The polishing accelerator according to the present invention is a basic salt which is formed from a tri-or tetravalent metal and an inorganic or organic acid. Among basic salts, there is exemplified preferably as a polishing accelerator a basic aluminum nitrate represented by the chemical composition $Al(OH)_x(NO_3)_{3-x}$ (wherein X is a real number of 0.5 to 2.7). Although the aqueous solution of the basic aluminum nitrate may form partially a polymer, it is represented for convenience's sake by the above-mentioned chemical composition. The basicity of basic aluminum nitrate means the ratio of hydroxyl groups bonded to aluminum ions, which is $(X/3) \times 100\%$ in $Al(OH)_x(NO_3)_{3-x}$. Thus, the basicity of basic aluminum nitrate according to the present invention may be 16.7 to 90% and preferably the basicity is 26.7 to 76.0%.

The content of the polishing accelerator for the basic salt formed from a trivalent metal and an inorganic or organic acid in the polishing composition is represented by the reduced concentration of metal oxide $M_2O_3$ (wherein M represents a trivalent metal atom) and for the basic salt formed from a trivalent metal and an inorganic or organic acid by the reduced concentration of $MO_2$ (wherein M represents a tetravalent metal atom). The content of less than 0.1 wt % does not show the effect of the polishing accelerator and the content of more than 10 wt % does not improve further the effect, so that a content of 0.1 to 10 wt % is preferred in the polishing composition.

More preferably, a content of 0.3 to 6 wt % may stabilize the effect of the polishing accelerator and maintain a high ratio of removal rate to the surface roughness.

When alumina having a mean particle size of more than 0.4 μm as the abrasive agent of alumina according to the present invention is used instead of alumina having a mean particle size of 0.1 to 0.4 μm, the surface roughness of polished surface is larger than before. On the other hand, when alumina having a mean particle size of 0.1 μm is used, the removal rate is decreased. Further, the addition of silica particles or silica sol being charged positive and having a mean particle size of 0.01 to 0.2 μm to alumina having a mean particle size of 0.1 to 0.4 μm may provide particles with the close-packed structure and level still more the polished surface.

When alumina having the alumina crystalline structure with an alpha-phase content of more than 95% as the abrasive agent of alumina is used instead of alumina having the alumina crystalline structure with an alpha-phase content of 80–95%, the removal rate is increased but the surface roughness is greater so that the ratio of removal rate to the surface roughness is smaller, resulting in a smaller polishing property. On the other hand, when alumina having the alumina crystalline structure with an alpha-phase content of less than 80% is used, the removal rate is decreased without changing the surface roughness of the polished surface, so that the ratio of removal rate to the surface roughness is smaller, resulting in a small polishing property.

The content of less than 1 wt % of abrasive agent of alumina provides a small polishing effect, and the content of even more than 20 wt % does not improve the effect, so that the content of 1 to 20 wt % of abrasive agent of alumina is preferred in the polishing composition.

EXAMPLES

The present invention will be described in detail with reference to the following examples.

Preparation of Polishing Composition

Example 1

750 g of calcined alumina powder from the Bayer process (mean particle size: 0.78 μm, alha-phase content: 85%), 12.6 kg of zirconia beads of 1 mmφ and 1,600 of pure water are charged in a 3 L attritor vessel (Mitsui Mining & Smelting Co., Ltd.) and pulverized at 200 rpm for 7.5 hrs to yield an aqueous alumina slurry (A) containing as solid 31 wt % of alumina having a mean particle size of 0.32 μm and an alumina crystalline structure with an alpha-phase content of 85%.

Then, 380 g of aluminum nitrate 9 $H_2O$ salt are dissolved in 1 kg of pure water, the aqueous solution is boiled and 1,320 g of aqueous 35% solution of hydrogen peroxide and 110 g of metallic aluminum powder are added, gradually dissolved and reacted. The reaction solution is filtered to yield an aqueous solution of basic aluminum nitrate (a). The aqueous solution of basic aluminum nitrate (a) was one having an $Al_2O_3$ reduced concentration of 9.9 wt %, a nitrate ion concentration of 7.2 wt % and a basicity of 80.0%, and being represented by the chemical composition $Al(OH)_{2.4}(NO_3)_{0.6}$.

Further, 60 wt % nitric acid is added to the aqueous solution of basic aluminum nitrate (a) to prepare an aqueous solution of basic aluminum nitrate (b). The aqueous solution of basic aluminum nitrate (b) was one having an $Al_2O_3$ reduced concentration of 7.1 wt %, a nitrate ion concentration of 17.3 wt% and a basicity of 33.3% and being represented by the chemical composition $Al(OH)(NO_3)_2$.

Upon diluting the aqueous alumina slurry (A) with pure water, the aqueous solution of basic aluminum nitrate (b) as a polishing accelerator is added thereto to prepare a polishing composition (1Ab), which had as basic aluminum nitrate having a basicity of 33.3% an $Al_2O_3$ reduced concentration of 1.2 wt %, a nitric acid concentration of 3.0% wt %, and a solid alumina content of 10 wt %.

Example 2

A polishing composition (2Ab) is prepared in the same manner as in Example 1 except that the concentration of basic aluminum nitrate having a base degree of 33.3% as a polishing accelerator is increased. The polishing composition (2Ab) had as basic aluminum nitrate having a basicity of 33.3% an $Al_2O_3$ reduced concentration of 1.6 wt %, a nitric acid concentration of 4.0 wt % and a solid alumina content of 10 wt %.

Example 3

60 wt % nitric acid is added to the aqueous solution of basic aluminum nitrate (a) having a basicity of 80.0%, which was obtained in Example 1, to prepare an aqueous solution of basic aluminum nitrate (c). The aqueous solution of basic aluminum nitrate (c) was one having an $Al_2O_3$ reduced concentration of 8.3 wt %, a nitrate ion concentration of 10.0 wt % and a basicity of 66.7% and being represented by the chemical composition $Al(OH)_2(NO_3)$.

Thus, upon diluting the aqueous alumina slurry (A) obtained in the same manner as in Example 1 with pure water, the aqueous solution of basic aluminum nitrate (c) as a polishing accelerator is added thereto to prepare a polishing composition (3Ac). The polishing composition (3Ac) had as basic aluminum nitrate having a basicity of 66.7% an $Al_2O_3$ reduced concentration of 2.1 wt %, a nitric acid concentration of 2.6 wt %, and a solid alumina content of 10 wt %.

Example 4

The aqueous alumina slurry (A) obtained as in the same manner in Example 1 is diluted with pure water to prepare a polishing composition (4A) having a solid alumina content of 10 wt %.

Example 5

Upon diluting the aqueous alumina slurry (A) obtained in the same manner as in Example 1, an aqueous solution of aluminum nitrate (d) as a polishing accelerator is added thereto to prepare a polishing composition (5Ad). The polishing composition (5Ad) had as aluminum nitrate an $Al_2O_3$ reduced concentration of 1.2 wt %, a nitric acid concentration of 4.5 wt % and a solid alumina content of 10 wt %.

Example 6

750 g of commercially available calcined alumina powder from the Bayer process (mean particle size: 1.07 μm, alpha-phase content: 55%), 12.6 kg of zirconia beads of 1 mmφ and 1,600 g of pure water are charged in a 3 L attritor vessel (Mitsui Mining & Smelting Co., Ltd.) and pulverized at 200 rpm for 7.5 hrs to yield an aqueous alumina slurry (B) containing a solid 31 wt % of alumina having a mean particle size of 0.30 μm and an alumina crystalline structure with an alpha-phase content of 55%.

Thus, upon diluting the aqueous alumina slurry (B) with pure water, the aqueous solution of basic aluminum nitrate (b) having a basicity of 33.3%, which was obtained in Example 1, as a polishing accelerator is added to prepare a polishing composition (6Bb) which had as basic aluminum nitrate having a basicity of 33.0% an $Al_2O_3$ reduced concentration of 1.6 wt %, a nitric acid concentration of 4.0 wt % and a solid alumina content of 10 wt %.

Example 7

750 g of commercial calcined alumina powder from the Bayer process (mean particle size: 1.00 μm, alpha-phase content: 98%), 12.6 kg of zirconia beads of 1 mmφ and 1,600 g of pure water are charged in a 3 L attritor vessel (Mitsui Mining & Smelting Co., Ltd.) and pulverized at 200 rpm for 8.5 hrs to yield an aqueous alumina slurry (C) containing a solid 31 wt % of alumina having a mean particle size of 0.35 μm and alumina crystalline structure with an alpha-phase content of 98%.

Thus, upon diluting the aqueous alumina slurry (C) with pure water, the aqueous solution of basic aluminum nitrate (b) having a basicity of 33.3%, which was obtained in Example 1, as a polishing accelerator is added thereto to yield a polishing composition (7Cb). The polishing composition (7Cb) had as a basic aluminum nitrate having a basicity of 33.3% an $Al_2O_3$ reduced concentration of 1.6 wt %, a nitric acid concentration of 4.0 wt % and a solid alumina content of 10 wt %.

Example 8

750 g of commercially available calcined alumina powder from the Bayer process (mean particle size: 1.20 μm, alpha-phase content: 75%), 12.6 kg of zirconia beads of 1 mmφ and 1,600 g of pure water are charged in a 3 L attritor vessel (Mitsui Mining & Smelting Co., Ltd.) and pulverized at 200 rpm for 7.5 hrs to yield an aqueous alumina slurry (D) containing as solid 31 wt % of alumina having a mean particle size of 0.33 μm and alumina crystalline structure with an alpha-phase content of 75%.

Thus, upon diluting the aqueous alumina slurry (D) with pure water, the aqueous solution of aluminum nitrate (d) as a polishing accelerator is added thereto to yield a polishing composition (8Dd). The polishing composition (8Dd) had as aluminum nitrate an $Al_2O_3$ reduced concentration of 1.2 wt %, a nitric acid concentration of 4.5 wt % and a solid alumina content of 10 wt %.

Example 9

750 g of commercially available calcined alumina powder from the Bayer process (mean article size: 1.00 μm, alpha-phase content: 98%), 12.6 kg of zirconia beads of 1 mmφ and 1,600 g of pure water are charged in a 3 L attritor vessel (Mitsui Mining Ltd.) and pulverized at 200 rpm for 4 hrs to yield an aqueous alumina slurry (E) containing as solid 31 wt % of alumina having a mean particle size of 0.57 μm and alumina crystalline structure with an alpha-phase content of 98%.

Thus, on diluting the aqueous alumina slurry (E) with pure water, the aqueous solution of sodium gluconate (e) as a polishing accelerator is added thereto to yield a polishing composition (9Ee). The polishing composition (9Ee) had a sodium gluconate concentration of 1.2% and a solid alumina content of 10 wt %.

Example 10

On diluting the aqueous alumina slurry (A) obtained in the same manner as in Example 1, an aqueous nitric acid boehmite sol (f), in which plate-like boehmite particles having a major axis of 20 to 30 nm are dispersed, as a polishing accelerator and 60 wt % nitric acid are added thereto to prepare a polishing composition (10Af). The polishing composition (10Af) had as boehmite an $Al_2O_3$ reduced concentration of 1.2 wt %, a nitric acid concentration of 3.0 wt %, and a solid alumina content of 10 wt %.

Polishing Test

The polishing test is carried out as follows:

A 2.5 inch memory hard disk substrate, in which a layer at Ni—P is non-elecrrolysis plated in a thickness of 10 μm on a substrate of aluminum, is used as a specimen to be processed. The substrate was subjected to the preliminary polishing, and had a mean surface roughness of 1.8 nm.

A polyurethane polishing pad of suede-type (POLITEX DG (trade mark), 250 mm φ, Rodel-Nitta, Inc.) is applied to the table of a Oscar-type lens polishing machine, the surface to be polished of the substrate is faced to the pad and polished with a load of 14 kPa. The rotation speed of the table is 30 rpm and the amount of the polishing composition fed is 2 ml/min. After polishing, the specimen is removed and washed repeatedly by ultrasonic cleaning.

After cleaning, the aluminum disk is dried and the removal rate is determined from the reduction of weight. The surface defect is observed by means of differential interference microscope to judge the degree of asperity, pit, scratch etc. The mean surface roughness are determined by the scanning white light interferometry or phase-contrast measurement method using FDA by means of a commercial device, for example, "New View 100" of Zygo Corp., USA.

The properties of polishing compositions having a solid alumina content of 10 wt % are shown in Table 1.

TABLE 1

| Polishing Composition | Abrasive Agent | | Polishing Accelerator | | |
|---|---|---|---|---|---|
| | Mean Particle Size (nm) | α-phase content (%) | Name of Accelerator | Content (wt %) | Basicity (%) |
| 1Ab | 0.32 | 85 | basic aluminum nitrate | 1.2 | 33.3 |
| 2Ab | 0.32 | 85 | ditto | 1.6 | 33.3 |
| 3Ac | 0.32 | 85 | ditto | 2.1 | 66.7 |
| 4A | 0.32 | 85 | none | — | — |
| 5Ad | 0.32 | 85 | aluminum nitrate | 1.2 | 0 |
| 6Bb | 0.30 | 55 | basic aluminum nitrate | 1.6 | 33.3 |
| 7Cb | 0.35 | 98 | ditto | 1.6 | 33.3 |
| 8Dd | 0.33 | 75 | aluminum nitrate | 1.2 | 0 |
| 9Ee | 0.57 | 98 | sodium gluconate | 1.2 | 0 |
| 10Af | 0.32 | 85 | aqueous nitric acid boehmite sol, nitric acid | 1.2 | — |

Note: The content of polishing accelerator in Table 1: When basic aluminum nitrate, aluminum nitrate or nitric acid boehmite sol as a polishing accelerator is used, the content is represented by the $Al_2O_3$ reduced concentration. When sodium gluconate is used, it is represented by the concentration of sodium gluconate.

In the test result, pits and scratches were occurred on the polished surface for the polishing composition (4A) and (10Af), whereas the occurrence of pits and scratches on the polished surface was not observed for other polishing compositions. The results of the removal rate, mean surface roughness and ratio of removal rate to mean surface roughness in the polishing test are shown in Table 2.

TABLE 2

| Polishing Composition | Removal Rate Vp (nm/min) | Mean Surface Roughness Ra (nm) | Ratio of Removal Rate to Mean surface Roughness Vp/Ra ($min^{-1}$) |
|---|---|---|---|
| 1Ab | 194 | 0.58 | 335 |
| 2Ab | 186 | 0.60 | 310 |
| 3Ac | 189 | 0.56 | 338 |
| 4A | 107 | 0.85 | 126 |
| 5Ad | 161 | 0.70 | 230 |
| 6Bb | 158 | 0.69 | 229 |
| 7Cb | 200 | 0.80 | 250 |
| 8Dd | 105 | 0.53 | 198 |
| 9Ee | 215 | 1.15 | 187 |
| 10Af | 104 | 1.21 | 86 |

It is seen from Table 2 that the ratio of removal rate to mean surface roughness shows a high value of more than 300 $min^{-1}$ for the group of polishing composition (1Ab), (2Ab) and (3Ac), which contain basic aluminum nitrate as a polishing accelerator and alumina having a mean particle size of 0.32 μm and an alumina-crystalline structure with an alpha-phase content of 85%. On the other hand, for the composition (4A) without a polishing accelerator and the composition (5Ad) containing aluminum nitrate as a polishing accelerator, the ratio of removal rate to the mean surface roughness is less than 230 $min^{-1}$ and it is seen that the group of composition (1Ab), (2Ab) and (3Ac) shows a superior polishing property. The ratio of removal rate to mean surface roughness is less than 250 $min^{-1}$ for the polishing composition (6Bb) containing an abrasive agent of alumina having a low alpha-phase content of 55% and the polishing composition (7Cb) having a high alpha-phase content of 98%, and also it is seen that the group of composition (1Ab), (2Ab) and (3Ac) shows a superior polishing property.

The ratio of removal rate to mean surface roughness is less than 200 $min^{-1}$ for the polishing composition (8Dd), (9Ee) and (10Af) as prior art and it is seen that the polishing property of prior art is inferior to the group of composition (1Ab),(2Ab) and (3Ac).

The polishing accelerator according to the present invention is a basic salt formed from a tri-or tetravalent metal and an inorganic or organic acid. It is thought that a basic salt such as basic aluminum nitrate shows as a normal salt such as aluminum nitrate the effect to promote the chemical polishing effect to the disk of aluminum, and shows a buffer effect to promote the chemical polishing effect to the disk of aluminum, and shows a buffer effect to keep the pH-value of polishing composition more neutral than the normal salt, so that an excessive etching on polishing is prevented to minimize the surface roughness and the surface defect resulting in a polished surface of high quality. Consequently, the ratio of removal rate to the surface roughness is greater and a superior polishing property is obtained. The polishing composition according to the present invention shows a high speed polishing property and provides a polished surface of high quality so that it is possible to improve the productivity in the polishing steps and lower the cost.

Obviously, the polishing composition according to the present invention is available for polishing the surface of layer of non-electrolysis nickel—phosphorous (Ni—P) plating formed on the aluminum disk capable of being provided as an industrial product, especially the surface of a hard layer of non-electrolysis(Ni—P) plating having a composition of 90 to 92% Ni and 8 to 10% P, the surface of alumina layer or the surface of aluminum, its alloy and alumite. Further, the polishing composition according to the present invention may be used for the precision polishing of a magnetic head, array metal of semiconductor multilayer array substrate, insulating layer of semiconductor multilayer array substrate and the like.

What is claimed is:

1. A polishing composition for an aluminum disk, comprising water, an abrasive agent of alumina, and a polishing accelerator which is a basic aluminum nitrate represented by the chemical composition $Al(OH)_x(NO_3)_{3-x}$ (wherein x is a real number of from 0.5 to 2.7).

2. A polishing composition for an aluminum disk as claimed in claim 1, wherein said abrasive agent of alumina is alumina having a mean particle size of 0.1 to 0.4 μm and an alumina crystalline structure with an alpha-phase content of 80 to 95%.

3. A process for polishing the surface of an aluminum disk with a polishing composition being provided between the surface of the aluminum disk and a surface of a polishing pad that can slide on the surface of the aluminum disk, wherein:

the surface of aluminum disk comprises any one of aluminum, aluminum alloy, a layer of non-electrolysis nickel-phosphorous (Ni—P plating), a layer of non-electrolysis nickel boron (Ni—B plating), or a layer of alumina; and said polishing composition comprises water, an abrasive agent of alumina, and a basic aluminum nitrate represented by the chemical composition $Al(OH)_x(NO_3)_{3-x}$ (wherein x is a real number of from 0.5 to 2.7).

4. A process for polishing the surface of an aluminum disk as claimed in claim 3, wherein said abrasive agent of alumina is alumina having a mean particle size of 0.1 to 0.4 μm and an alumina crystalline structure with an alpha-phase content of 80 to 95%.

5. A polishing composition for an aluminum disk as claimed in claim 1, wherein the polishing composition comprises 0.3 to 6 wt % of the polishing accelerator.

6. A process for polishing the surface of an aluminum disk as claimed in claim 3, wherein the polishing composition comprises 0.3 to 6 wt % of the basic aluminum nitrate.

7. A polishing composition for an aluminum disk as claimed in claim 1, wherein the basic aluminum nitrate has a basicity represented by the formula:

(x/3)×100 in the chemical composition $Al(OH)_x(NO_3)_{3-x}$, and where the basic aluminum nitrate has a basicity of from 26.7% to 76%.

8. A process for polishing the surface of an aluminum disk as claimed in claim 3, wherein the basic aluminum nitrate has a basicity represented by the formula:

(x/3)×100 in the chemical composition $Al(OH)_x(NO_3)_{3-x}$, and where the basic aluminum nitrate has a basicity of from 26.7% to 76%.

9. A polishing composition for an aluminum disk as claimed in claim 1, wherein the polishing composition comprises 1 to 20 wt % of the alumina.

10. A process for polishing the surface of an aluminum disk as claimed in claim 3, wherein the polishing composition comprises 1 to 20 wt % of the alumina.

* * * * *